United States Patent
Evans

(10) Patent No.: US 7,357,741 B2
(45) Date of Patent: *Apr. 15, 2008

(54) BELT LOOPING

(75) Inventor: Nigel Evans, Sutton Coldfield (GB)

(73) Assignee: Production Resource Group, L.L.C., New Windsor, NY (US)

( * ) Notice: Subject to any disclaimer, the term of this patent is extended or adjusted under 35 U.S.C. 154(b) by 609 days.

This patent is subject to a terminal disclaimer.

(21) Appl. No.: 10/620,842

(22) Filed: Jul. 15, 2003

(65) Prior Publication Data

US 2004/0053720 A1 Mar. 18, 2004

Related U.S. Application Data

(63) Continuation of application No. 09/780,616, filed on Feb. 8, 2001, now Pat. No. 6,592,480, and a continuation of application No. PCT/US01/04328, filed on Feb. 8, 2001.

(60) Provisional application No. 60/181,492, filed on Feb. 10, 2000.

(51) Int. Cl.
*F16H 7/14* (2006.01)
*H04N 5/238* (2006.01)
*G01J 3/28* (2006.01)

(52) U.S. Cl. .................... 474/118; 474/117; 348/368; 356/200; 356/330

(58) Field of Classification Search ........ 474/117–118, 474/112–114; 358/108, 209, 225; 250/237 G, 250/570, 226, 568; 362/277, 322, 286, 293; 359/216, 234, 578, 589, 264, 319; 348/203, 348/368, 373; 356/330
See application file for complete search history.

(56) References Cited

U.S. PATENT DOCUMENTS

| | | | |
|---|---|---|---|
| 2,753,812 A | | 7/1956 | Wharton |
| 2,956,117 A | | 10/1960 | Ernst et al. |
| 3,573,471 A | * | 4/1971 | Kolb ..................... 250/568 |
| 3,632,871 A | * | 1/1972 | Watkins et al. ........... 348/203 |
| 3,687,554 A | * | 8/1972 | Iwahashi ................. 356/330 |
| 3,859,862 A | | 1/1975 | Brems |
| 3,931,787 A | | 1/1976 | Kuttner et al. |
| 4,161,000 A | | 7/1979 | Cleveland |
| 4,231,643 A | | 11/1980 | Demick et al. |
| 4,370,677 A | | 1/1983 | Baldwin et al. |
| 4,551,763 A | | 11/1985 | Swinehart et al. |
| 4,571,629 A | | 2/1986 | Horio et al. |
| 4,843,528 A | | 6/1989 | Pearce-Harvey et al. |
| 5,825,548 A | | 10/1998 | Bornhorst et al. |
| 6,352,357 B1 | | 3/2002 | Woolard |

FOREIGN PATENT DOCUMENTS

WO    WO 94/20787 A1 *  9/1994

* cited by examiner

*Primary Examiner*—Marcus Charles
(74) *Attorney, Agent, or Firm*—Law Office SC Harris

(57) ABSTRACT

A high output light source, such as a stage lighting luminaire, produces light along a path. The belt which drives a driven device is kept away from that path by passing it around the opposite side of the pulley.

23 Claims, 2 Drawing Sheets

BELT LOOPING

CROSS-REFERENCE TO RELATED APPLICATIONS

This application is a continuation application of and claims priority to U.S. application Ser. No. 09/780,616, filed on Feb. 8, 2001, now U.S. Pat. No. 6,592,480 and International Application No. PCT/US01/04328, filed on Feb. 8, 2001, both of which claim the benefit of U.S. Provisional Application No. 60/181,492, filed on Feb. 10, 2000.

BACKGROUND

It is known to use belts to connect between a motor of a stage light, or luminaire, and a driven element of the stage light. Motors often drive the various mechanical elements of a luminaire and allow the luminaire to perform many of the different functions that it carries out.

Color changing elements for such a luminaire often effect color changing by moving a color changing element. Therefore the motor becomes an essential part of this function. Since the luminaire is designed for projecting on a stage, the light output is usually very intense. This intense light, or more specifically the light beam within the luminaire, can often generate large amounts of heat. This heat can significantly damage belts that drive mechanical elements within the luminaire, especially if they are located too close to the light beam. For instance, there are often space limitations which restrict the choice of location for a motor relative to it's associated driven element. In some cases, the conventional path followed by the drive belt places it in, or very close to the light beam. This becomes even more of a problem when the intensity of the light is increased. For example, in the Light and Sound Design™ Icon-M™, a 700 watt or even a 1200 watt bulb may be used. This can greatly increase the heat in such a system.

SUMMARY

The present application teaches an alternative method of using a belt to drive a driven element in a luminaire device, and specifically in such a device that uses a large amount of light, e.g., more than 300 watts, more preferably more than 500 watts, and even more preferably, more than 600 watts. The belt is run in a specific way to keep it away from the heat as much as possible.

DETAILED DESCRIPTION

Figure 2:
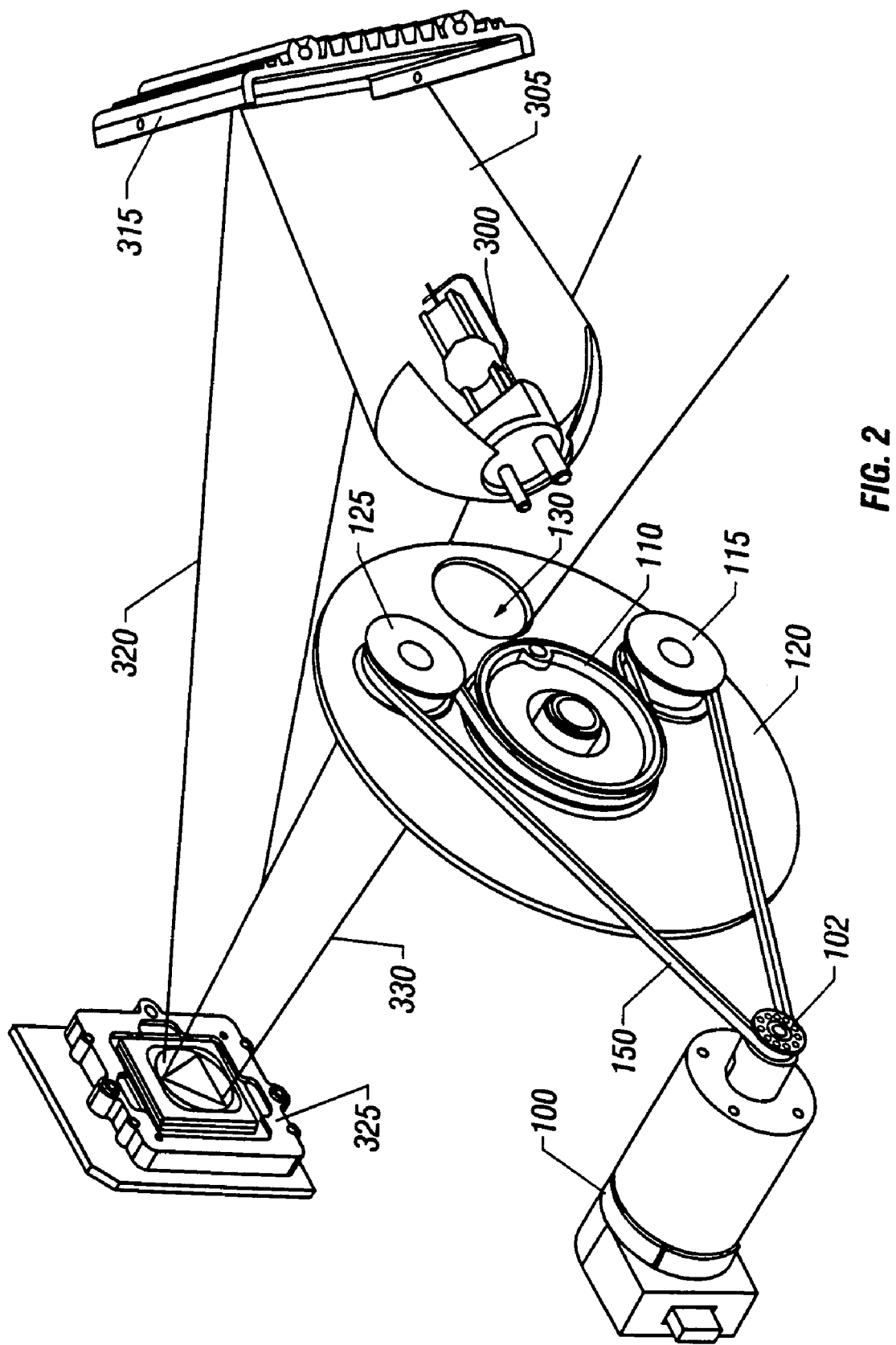
FIG. 2 shows a block diagram of the entire system.

A schematic view of the system is shown in FIG. 2. A lamp 300 produces a high intensity light beam 305. This light beam is directed onto a cold mirror 315 and some of the heat within the light beam is removed by the cold mirror, (due to the mirror's ability to pass infra red light and reflect visible light). The "cooled" light beam 320 is then coupled to a Digital Micromirror Device (DMD) 325, and reflected again as light beam 330. Even though some heat is removed from the light beam by the cold mirror, a significant amount of heat is usually still present in the reflected light beam, and enough that could damage a drive belt.

An optical part, here a rotating part, e.g., driven element 120 is shown in the path of the light beam 330, although it could alternatively be in the path of light beam 320 or even light beam 305. The path of the light beam defines an optical axis.

Figure 1:
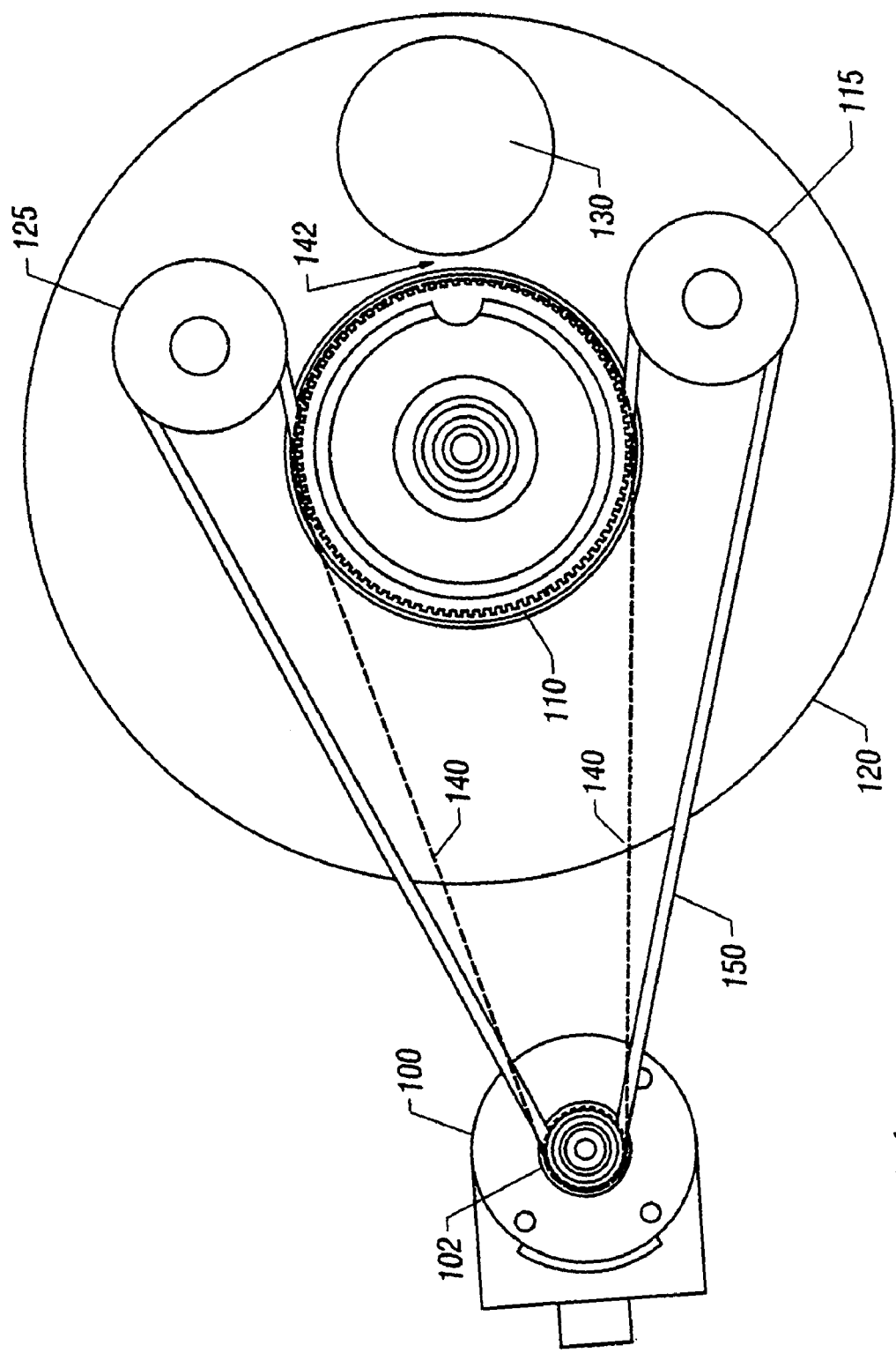
FIG. 1 shows a schematic of the belt paths.

A schematic of the driven element 120 is shown in FIG. 1. This system uses two idlers 115 and 125 maintaining drive to a pulley by means of a belt, but also keeping the belt out of the heat.

A motor 100 drives a pulley 102 that in turn drives the belt 150. The driven element 120 intersects the light gate 130, thereby altering the light in some way, e.g. altering the color or shape of the light. The driven element 120 is mounted on a pulley 110.

According to this system, two idlers shown as 115 and 125 are used as a belt redirecting mechanism. The belt is wrapped around the pulley 102, the outside of idler 125, around a portion of pulley 110 which is typically on the opposite side of the pulley to the light gate 130, and around the outside of idler 115.

In the disclosed embodiment, both sides of the belt are required to transmit drive, therefore a double-sided belt is used, (i.e. one having teeth on both sides). Alternative systems may use a single sided belt. For example, a second pair of idlers may be used to wrap the belt around a portion of pulley 102 in the same manner as for pulley 110.

Note that if the belt were connected around the pulley 110 in the conventional manner, it would pass along the path 140, and therefore close to the light gate 130. The conventional (prior art) system would cause the belt to come very close to the light gate at area 142. This heat can cause the belt to operate beyond its thermal limitations, and therefore can cause premature failure of the belt. The present system enables the belt to be kept away from the light gate, and consequently away from the heat.

Although only a few embodiments have been disclosed in detail above, other modifications are possible.

What is claimed is:

1. A system, comprising:
an optical source, projecting a light beam along an optical axis;
a pulley, having a frictional surface around an outer perimeter thereof, said pulley having an optical part thereon, and one side of said pulley being next to said optical axis, and said pulley defining a first area closest to said optical axis, and a second area furthest from said optical axis, and said pulley rotating to control a position of said optical part relative to said optical axis;
a motor, on a first side of the pulley, away from said heat source;
a belt extending between said motor and said pulley; and
a belt redirecting mechanism, which holds the belt around a frictional surface of the pulley, and redirects said belt to only pass through said second area of the pulley which is closest to the motor and furthest from the optical axis.

2. A system as in claim 1, wherein said belt redirecting mechanism includes first and second idlers, offset from both said motor and said belt, and having a first idler on a first side of said pulley and a second idler on a second side of said pulley.

3. A system as in claim 2, wherein said belt includes a first frictional surface on a first side thereof and a second frictional surface on a second side thereof.

4. A system as in claim 3, wherein said first and second idlers are arranged to contact a first frictional surface of the belt, and said second frictional surface of the belt is arranged to contact said pulley.

5. A system as in claim 3, wherein said frictional surface comprises ridges on the belt that match with corresponding ridges on the motor and on an outer surface of the pulley.

6. A system as in claim 1, wherein said optical part includes a light beam changing mechanism, attached to said pulley, having different light changing characteristics at different areas thereof, and rotated by said pulley to change the light characteristics.

7. A system as in claim 6, wherein said light beam changing mechanism is a color changer.

8. A system as in claim 6, wherein said light beam changing mechanism is a shape changer.

9. A system as in claim 6, further comprising a beam of light, producing said heat source.

10. A system as in claim 9, wherein said light has an intensity greater than 300 w.

11. A method of controlling an optical altering part, comprising:
providing a rotatable device adjacent to an optical axis created by a light source, to control an optical altering part that will be placed into said optical axis, wherein said movable device defines a first area which is closest to said optical axis, and a second area which is furthest from said optical axis; and
controlling rotating said rotatable device using a motor that is remote from said rotatable device and connects to said rotatable device using a belt, said rotating such that different parts of the device are placed into said optical axis, but the device always has said first area that is closest to said optical axis and said second area that is furthest from said optical axis; and said belt at any position of rotation of said rotatable device in said second area which is distant from said optical train.

12. A method as in claim 11, wherein said controlling comprises wrapping said belt around belt redirecting mechanisms.

13. A method as in claim 11, wherein said controlling comprises using a first frictional surface of the belt to connect with said motor, and using a second frictional surface of the belt to connect with said rotatable device.

14. A method as in claim 13, wherein said belt is a belt with ridges thereon, and said ridges match with corresponding ridges on an outer surface of the motor and an outer surface of the pulley.

15. A method as in claim 11, wherein said controlling comprises controlling a color changer to move to change a color of a light beam which forms said source of heat.

16. A method as in claim 11, wherein said controlling comprises controlling a light beam shaping element to move to change a shape of a light beam which forms said source of heat.

17. A method as in claim 11, wherein said source of heat is formed by a light beam greater than 300 W in intensity.

18. A method of controlling a rotatable device, comprising:
providing a rotatable device adjacent to a light beam, to change a characteristic of the light beam depending on a position of rotation; and
controlling said rotatable device using a remote motor, and a belt connection between said remote motor and said movable rotatable device, wherein said controlling comprises winding a belt around said motor and said rotatable device, wherein said rotatable device has a first side which is closest to the light beam and a second side which is furthest from the light beam, and wherein said winding comprises always maintaining said belt on said second side.

19. A method as in claim 18, wherein said light beam is a light beam of at least 300 W of intensity.

20. A method as in claim 19, wherein said controlling comprises wrapping the belt around idlers to change a path of the belt.

21. A method as in claim 19, wherein said controlling comprises using a first surface of the belt to connect to said remote motor and a second surface of the belt to connect to said movable device.

22. A method as in claim 18, wherein said light beam is a light beam of at least 600 W of intensity.

23. A method as in claim 18, wherein said controlling uses said belt which has ridges on both first and second sides, a first side of said ridges connecting with corresponding ridges on the remote motor, and a second side of said ridges connecting with corresponding ridges on said second side of said rotatable device.

* * * * *